(12) United States Patent
Sah et al.

(10) Patent No.: US 11,463,909 B1
(45) Date of Patent: Oct. 4, 2022

(54) PACKET DATA CONVERGENCE PROTOCOL CONFIGURATION FOR INCREASING CHANNEL THROUGHPUT WITH ROBUST HEADER COMPRESSION

(71) Applicant: QUALCOMM Incorporated, San Diego, CA (US)

(72) Inventors: Deepak Sah, Hyderabad (IN); Nagamanikandan Sivakumar, Hyderabad (IN); Rahul Jain, Sawai Madhopur (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/301,292

(22) Filed: Mar. 30, 2021

(51) Int. Cl.
| | |
|---|---|
| *H04W 28/06* | (2009.01) |
| *H04L 69/04* | (2022.01) |
| *H04L 69/22* | (2022.01) |
| *H04W 76/19* | (2018.01) |
| *H04W 80/02* | (2009.01) |

(52) U.S. Cl.
CPC ............ *H04W 28/06* (2013.01); *H04L 69/04* (2013.01); *H04L 69/22* (2013.01); *H04W 76/19* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 2004/0042507 | A1* | 3/2004 | Pelletier | H04W 36/0033 370/521 |
| 2010/0322151 | A1* | 12/2010 | Racz | H04W 28/06 370/328 |
| 2020/0304604 | A1 | 9/2020 | Zhao et al. | |

OTHER PUBLICATIONS

International Search Report and Written Opinion dated Jun. 8, 2022 from corresponding PCT Application No. PCT/US2022/071140.
Richard Price et al.; Network Working Group; Internet-Draft; TCp_IP Compressed Packet Formats; May 28, 2003; 32 pgs.

* cited by examiner

*Primary Examiner* — Kenny S Lin
(74) *Attorney, Agent, or Firm* — Arent Fox LLP

(57) ABSTRACT

A wireless communication utilizes robust header compression efficiently with improved improvements in packet data convergence protocol configuration for increasing channel throughput. A user equipment (UE) receives a configuration indicating a first listing of header generic options that are supported between the UE and a first base station. The UE obtains a first packet including a first uncompressed header that indicates header parameters. The UE determines whether the header parameters in the first uncompressed header corresponds to at least one header generic option in the first listing of header generic options. The UE communicates the first packet that may have a first compressed header based on a first header compression profile or an uncompressed header depending on whether the header parameters in the first uncompressed header corresponds to at least one header generic option in the first listing of header generic options.

30 Claims, 10 Drawing Sheets

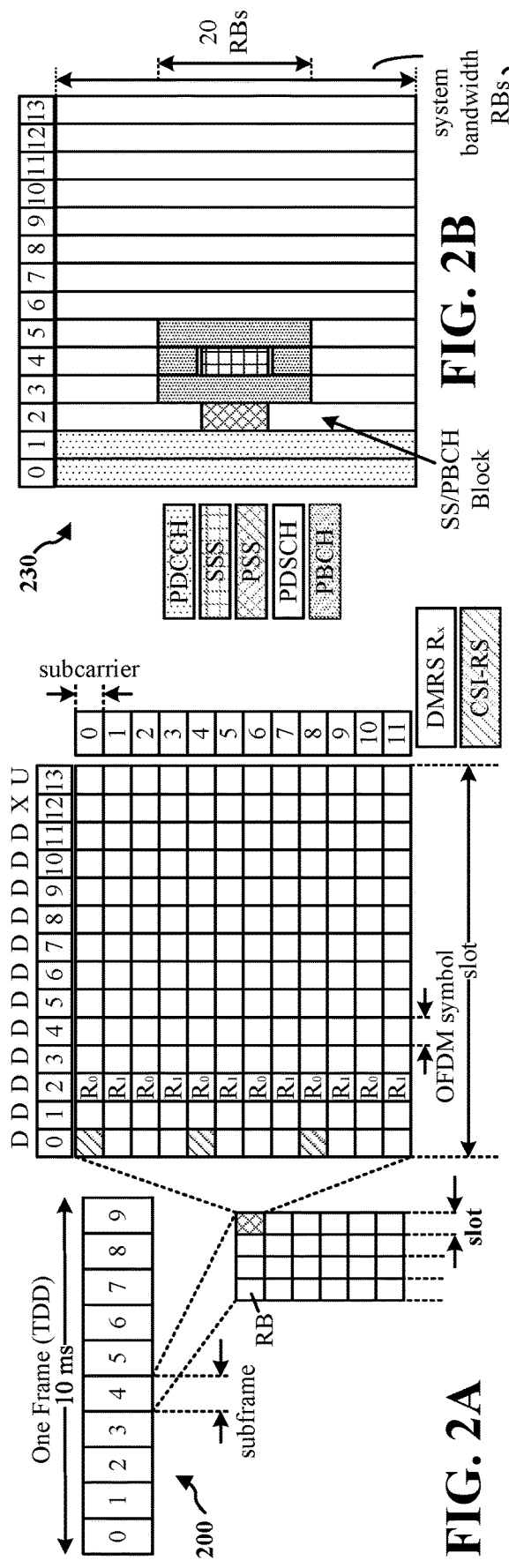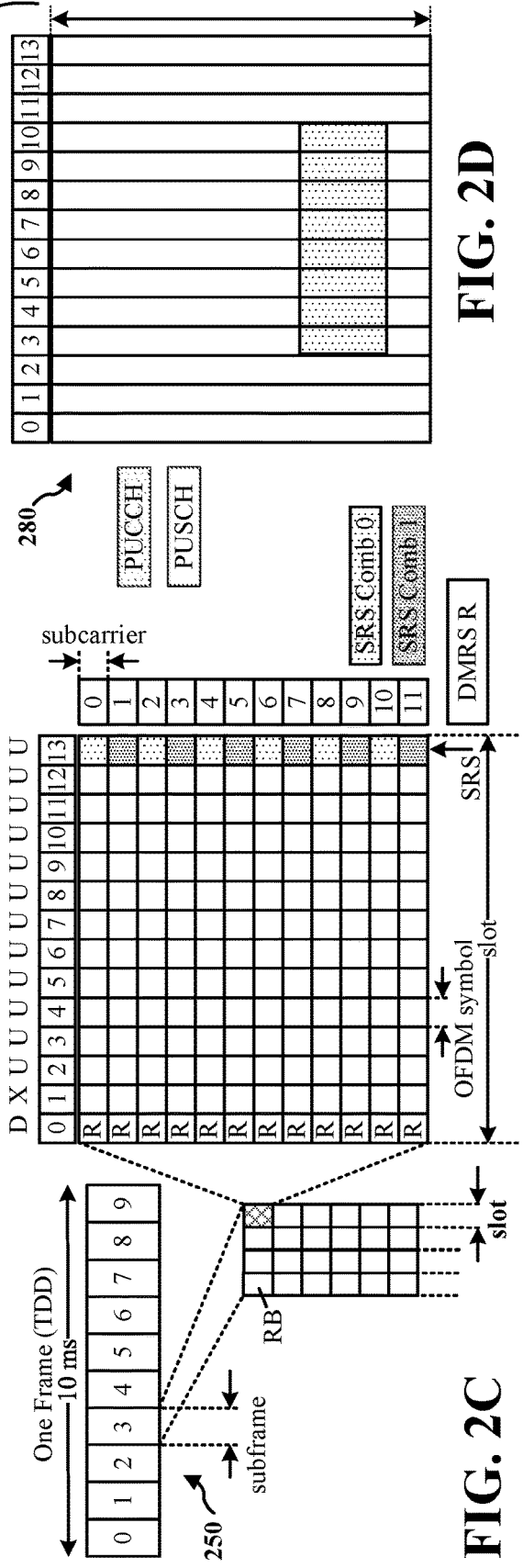

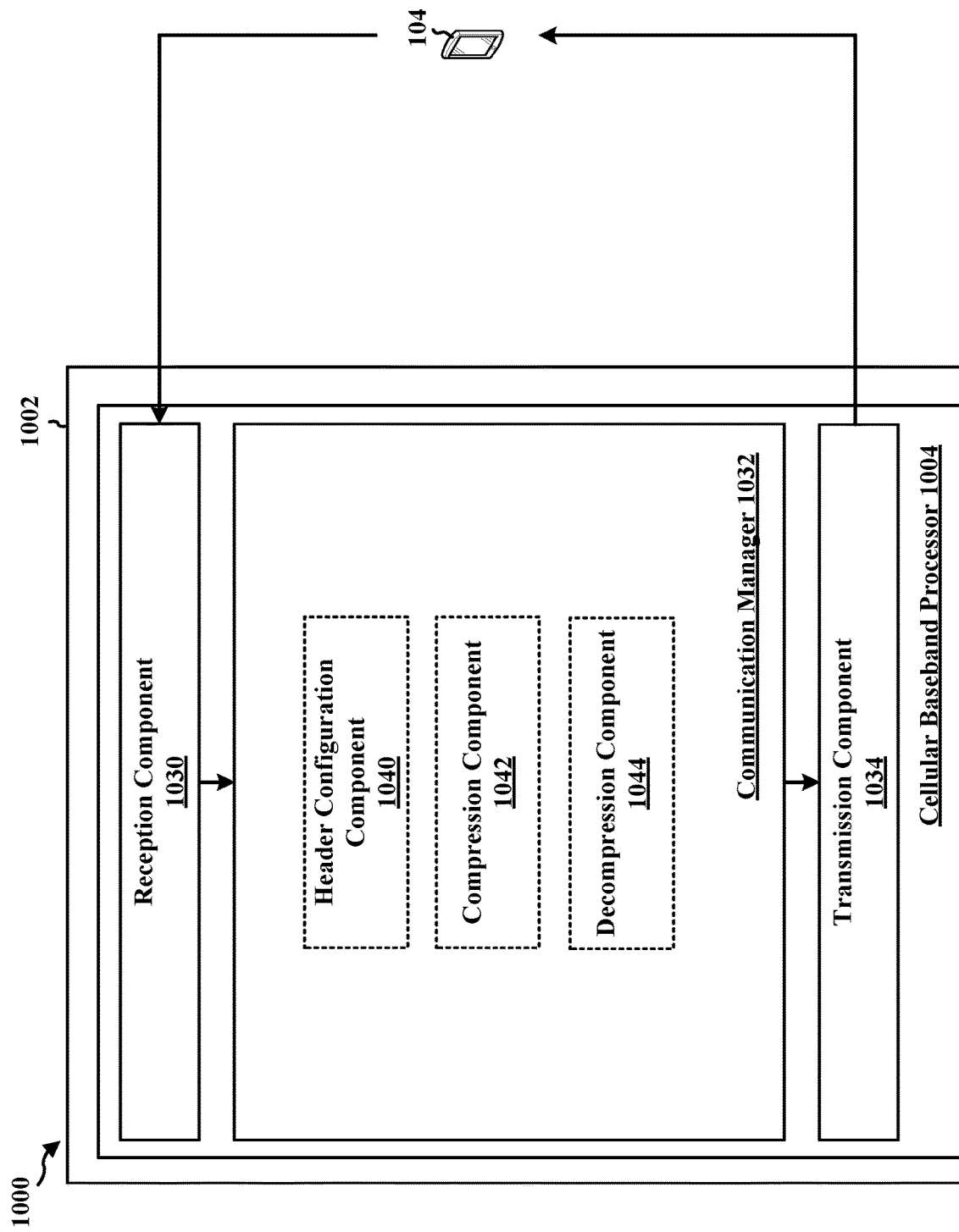

PACKET DATA CONVERGENCE PROTOCOL CONFIGURATION FOR INCREASING CHANNEL THROUGHPUT WITH ROBUST HEADER COMPRESSION

BACKGROUND

Technical Field

The present disclosure relates generally to communication systems, and more particularly, to wireless communication including improvement in packet data convergence protocol (PDCP) configuration for increasing channel throughput with robust header compression (ROHC).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Fifth Generation (5G) New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the Fourth Generation (4G) Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A compressor, as well as a decompressor, with ROHC capabilities can have implicit support for transmission control protocol (TCP) generic options. However, traditional approaches in TCP compression/decompression techniques may not have a predefined list of supported generic options. Since there is no predefined list of supported generic options, any of the compression or decompression operations may fail when a TCP packet having a generic option is present in an uncompressed packet and a compressor does not have support for compressing that generic option, resulting in that TCP packet being dropped by the compressor. If the compressor does not support compression of such TCP generic options, the packet can be dropped even when the packet is re-transmitted by the TCP network stack in a transmitting device and may eventually result in tear down of a TCP connection. If, on the other hand, a decompressor does not support TCP generic options, which are supported by the compressor at the peer side, the decompression may fail and negative feedback may be sent continuously even when the TCP packet with that TCP generic option is re-transmitted by the transmitting device, thus leading to loss of a TCP connection.

In some networks, when continuous compression/decompression failures are observed, the network may disable ROHC for a PDCP channel, and subsequent packets may be sent without any ROHC compression. This problem in the TCP data transmission can occur in the UE to base station direction, and conversely, a symmetrical problem in the TCP data transmission may occur from the base station to UE direction. This may result in an increase in bandwidth utilization, which is not desirable especially in cases of 5G networks, where data rate demand is significantly high.

In the present disclosure, the subject technology averts this problem by introducing a mechanism to "negotiate" TCP generic options supported by a UE and a base station prior to start of actual data traffic so that a compressor can decide to use a suitable profile (e.g., a TCP profile or an uncompressed profile) for compression instead of dropping a TCP packet, and similarly, a decompressor can decode the compressed TCP packet without any decompression failures.

In an aspect of the disclosure, a method, a computer-readable medium, and an apparatus are provided. The apparatus may be a UE. The UE is configured to receive, from a first base station, a configuration indicating a first listing of header generic options that are supported between the UE and the first base station. The UE may obtain a first packet comprising a first uncompressed header that indicates one or more header parameters. The UE may determine whether the one or more header parameters in the first uncompressed header corresponds to at least one header generic option in the first listing of header generic options. The UE may communicate, with the first base station, the first packet having a first compressed header based on a first header compression profile when the one or more header parameters in the first uncompressed header corresponds to the at least one header generic option in the first listing of header generic options. The UE may communicate, with the first base station, the first packet having the first uncompressed header based on a second header compression profile different than the first header compression profile when the one or more header parameters in the first uncompressed header does not correspond to the at least one header generic option in the first listing of header generic options.

In an aspect of the disclosure, a method, a computer-readable medium, and an apparatus are provided. The apparatus may be a base station. The base station is configured to communicate, with a user equipment (UE), a configuration indicating a listing of header generic options that are supported between the UE and the base station. The base station may receive, from the UE, a first packet comprising a compressed header encoded with a first header compression profile. The base station may decode the compressed header into an uncompressed header based on the first header compression profile, the uncompressed header having one or more first header parameters that correspond to at least one header generic option in the listing of header generic options.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 10 is a diagram illustrating an example of a hardware implementation for an example apparatus.

DETAILED DESCRIPTION

Figure 1:
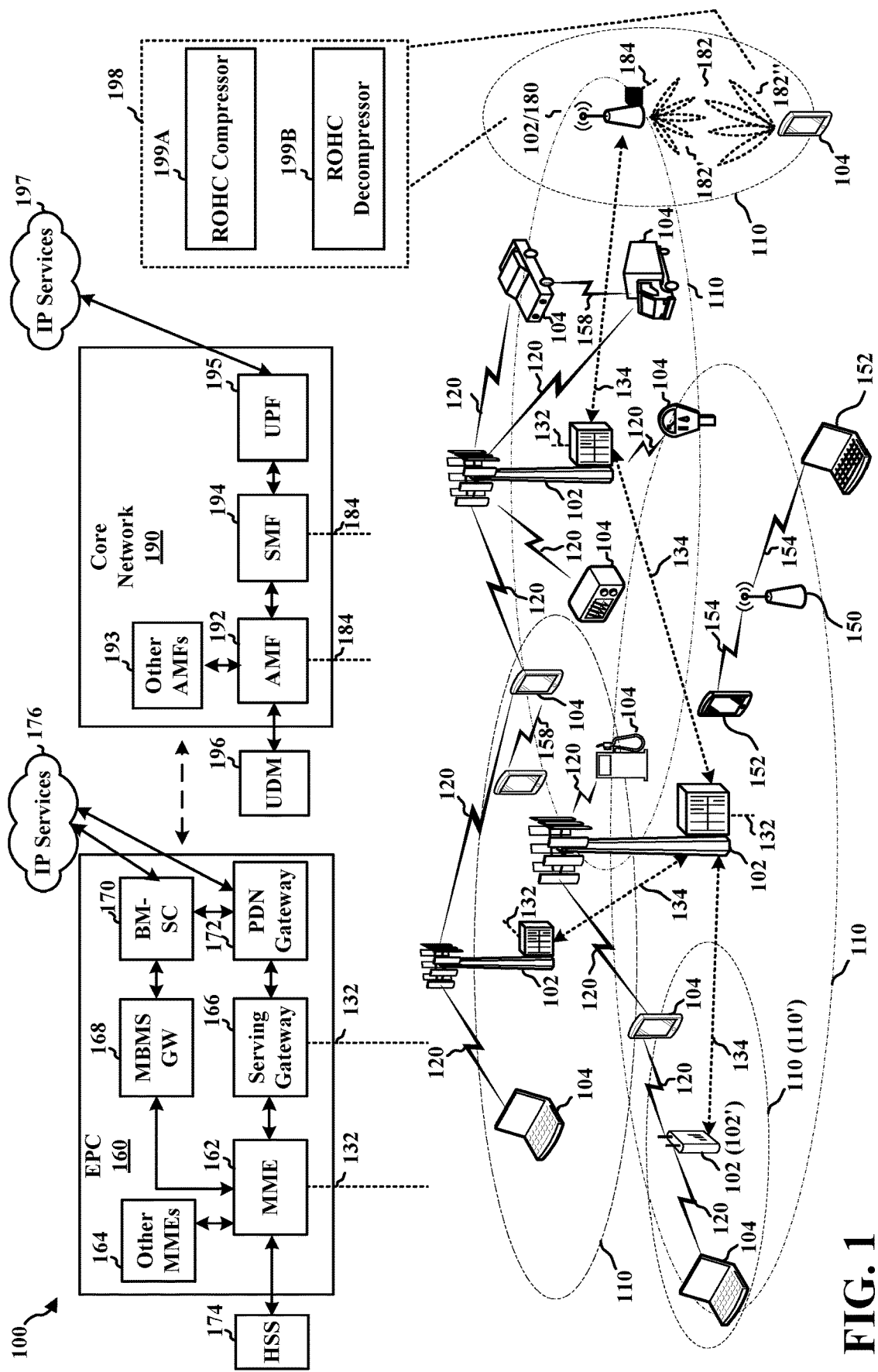
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides apparatus and methods for a transmitter device and a receiver device, such as, but not limited to, a UE and a base station, to negotiate supported TCP generic options to avoid or reduce dropped packets and/or decompression failures and/or uncompressed (e.g., higher overhead) data packet transmissions. In general, a compressor at the transmitter device, as well as a decompressor at the receiver device, may implement a robust header compression (ROHC) protocol or profile for compressing and/or decompressing TCP/Internet Protocol (IP) data packets. As such, the compressor and decompressor may be referred to as implementing a ROHC-TCP profile, which provides efficient and robust compression of TCP headers. The TCP protocol allows for optional header fields, referred to a TCP options, to define additional parameters or functions, such as maximum segment size, selective acknowledgements (SACK), and timestamps. For example, the TCP options in ROHC-TCP are compressed using a list compression encoding that allows option content to be established so that TCP options can be added to the context without having to send all TCP options uncompressed. As such, the ROHC TCP profile generally defines a header compression scheme that includes compressing TCP option headers. One type of TCP option is referred to as a TCP generic option, and compressors and decompressors implementing the ROHC TCP profile should have support for compressing/decompressing TCP generic options. However, since there is no predefined list of generic options to be supported, the compression or decompression may fail when a TCP packet having such a generic option is present. For example, for an uncompressed packet sent to the compressor with a generic option that is not supported by the compressor, the compressor performing RoHC may drop the packet. Further, if the ROHC compressor does not support the compression of such TCP generic options, the packet will be dropped even when it is re-transmitted by the TCP network stack in the device and may eventually result in tear down of the TCP connection. On the other hand, if the decompressor does not support TCP generic options which are supported by the TCP compressor at the peer side, the decompression fails and negative feedback is sent continuously even when the TCP packet with that TCP generic option is re-transmitted by the transmitting device (e.g., the sending UE), leading to TCP connection loss. In some networks, when continuous compression/decompression failures are seen, network disables ROHC for the PDCP channel and subsequent packets will be sent without any ROHC compression, which increases bandwidth utilization. This result is not desirable especially in case of 5G where data rate demand are very high.

Since a predefined list of TCP generic options to be supported may be non-existent in traditional compression/decompression systems between a UE and a base station, the TCP compression and/or decompression may fail in instances where a particular TCP generic option is not supported either by the compressor or decompressor. Due to repeated compression or decompression failures, the network may disable ROHC compression, causing all packets to be transmitted uncompressed, which reduces channel bandwidth and adversely impacts the channel throughput.

The subject technology may avoid or reduce one or more of the above problems by providing a mechanism within current wireless communication protocols, such as 4G LTE and NR 5G, which allows a negotiation or exchange of information between and compressor and a decompressor so that a supported TCP generic option of ROHC may be utilized. For example, in an implementation, the present solution introduces a mechanism to "negotiate" TCP generic options supported by a UE and a base station prior to start of actual data traffic so that a compressor can decide to use a suitable profile (e.g., a TCP profile or an uncompressed profile) for compression instead of dropping a TCP packet, and similarly, a decompressor can decode the compressed TCP packet without any decompression failures. In contrast, current wireless communication protocols do not provide any mechanism that allows such list of supported TCP generic options by configuration and/or prior to actual data traffic exchange. Thus, by providing a configuration list mechanism that allows supported ROHC TCP generic options to be identified and/or negotiated prior to a traffic exchange between a compressor and a decompressor, one or more problems associated with current wireless communication protocols may be overcome, resulting in more efficient wireless communications. Additionally, the present solution may be implemented within the ROHC protocol, e.g., between a compressor and decompressor in an ROHC communication, without affecting or requiring changes within the wireless communication protocol, e.g., without affecting re-establishment procedures/protocols such as RRC reconfiguration.

In some aspects, when ROHC is configured exclusively for uplink transmissions (e.g., configuration element referred to as "uplinkonlyrohc") by a PDCP configuration information element, certain ROHC configuration related parameters are also exchanged between the UE and the base station, such as a ROHC profile (e.g., TCP—0x0006) and a maximum context identifier. The subject technology provides for including a list of TCP generic options supported between a transmitting entity (e.g., compressor) and a receiving entity (e.g., decompressor) in the PDCP configuration information element. For example, the PDCP configuration information element indicating the list of supported TCP generic options can be provided within a radio resource control (RRC) connection reconfiguration, a radio bearer establishment or radio bearer modification. In some aspects, the list of supported TCP generic options can be located within the same uplinkonlyrohc configuration information element so that a UE-side compressor can be aware of supported TCP generic options such that the UE-side compressor can utilize either the ROHC profile (e.g., TCP—0x00006) or an uncompressed profile (e.g., ROHC UNCOMPRESSED—0x0000) based on whether TCP generic option(s) present in an uncompressed header of a TCP packet is supported by the network-side decompressor. For example, if a certain TCP generic option identifier in the list of supported TCP generic options is set to TRUE, then it indicates that it is supported by the network-side ROHC decompressor and the UE-side compressor can use the ROHC profile (e.g., TCP—0x00006) for compressing the TCP packets with that TCP generic option being present. Otherwise, the TCP packet is transmitted uncompressed based on an ROHC uncompressed profile (e.g., ROHC UNCOMPRESSED—0x000).

The subject technology provides advantages over traditional approaches in ROHC compression/decompression techniques by its compatibility across different radio access technologies (RATs), such as 4G LTE and 5G NR access technologies. The subject technology can support use case scenarios such as connection re-establishment due to any reasons such as radio link failure (RLF), a handover (HO), or the like. For example, in a connection re-establishment, the RRC reconfiguration message can ensure that a UE-side compressor is updated with a correct list of supported TCP generic options each time a radio bearer is modified and/or updated as per the current RAT.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system 100 (also referred to as a wireless wide area network (WWAN)), which includes base stations 102, UEs 104, and an Evolved Packet Core (EPC) 160 and/or another core network 190 (e.g., a 5G Core (5GC)). The base stations 102 and UEs 104 may include an ROHC unit 198 having a decompressor (e.g., of a receiver device) and a compressor (e.g., of a transmitter device) configured to negotiate supported TCP generic options to avoid or reduce dropped packets and/or decompression failures and/or uncompressed (e.g., higher overhead) data packet transmissions, as described in more detail below.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 and the base station 180 may be configured to communicate using one or more ROHC protocol techniques as described below with reference to FIGS. 3-11. The UE 104 and the base station 180 may include an ROHC unit 198 for compressing and/or decompressing data packets. For example, the ROHC unit 198 may include an ROHC Compressor 199A having one or more compression algorithms or profiles used to compress a data packet to be sent to a receiver device, and a ROHC decompressor with option feedback support 199B having one or more decompression algorithms or profiles used to decompress a compressed data packet received from a transmitter device.

In some implementations, a transmitter device may receive a PDCP configuration (prior to a data traffic exchange between the transmitter device and a receiver device), in which the PDCP configuration includes a list of TCP generic options that indicates a set of one or more supported ROHC generic options usable by a decompressor at the receiver device. In this regard, the transmitter device and the receiver device can negotiate the supported TCP generic options in advance to thereby reduce the number of occurrences of compression/decompression failures. For example, in an implementation from a transmitter device perspective, the ROHC compressor 199A may receive a first TCP packet for transmission to a receiver device and a ROHC option identifier. The first TCP packet and ROHC option may be generated by an application executing on the device hosting the ROHC compressor 199A, and the ROHC option identifier indicates a compression option, e.g., an ROHC protocol technique, of which the application would like the ROHC compressor 199A to use when sending the data packet to a receiver device. In some aspects, the ROHC compressor 199A may determine that the TCP option identifier corresponds to at least one of the TCP generic option identifiers listed in the list of supported TCP generic options. In response, the ROHC compressor 199A may compress the first TCP packet according to a first ROHC protocol technique corresponding to the first ROHC option identifier to create a first compressed TCP packet. Further, the ROHC Compressor 199A may transmit or cause transmission of the first compressed TCP packet to the receiver device. Correspondingly, the ROHC compressor 199A may transmit a second TCP packet to the receiver device as a second compressed TCP packet or as an uncompressed TCP packet based on the list of supported TCP generic options.

Similarly, in this example implementation from the receiver device perspective, the ROHC decompressor 199B may receive a first compressed TCP packet from the transmitter device. As briefly discussed above, the list of supported TCP generic options may be reflective of which TCP generic options are actually supported by the ROHC decompressor 199B. The ROHC decompressor 199B may attempt to decompress the first compressed TCP packet based on one or more supported TCP generic options usable by the decompressor that is listed in the predefined list of supported TCP generic options. The ROHC decompressor 199B may receive a second TCP packet as a second compressed TCP packet or as an uncompressed TCP packet based on the list of supported TCP generic options. The ROHC decompressor 199B may send the uncompressed TCP packet or a second decompressed TCP packet to an application program on the receiver device.

Although the following description may be focused on 5G NR, the concepts described herein may be applicable to other communication technologies, such as LTE, LTE-A, CDMA, GSM, and other wireless technologies.

Referring to FIGS. 2A, 2B, 2C, and 2D, the base station 102 and UE 104 may utilize one or more example frame structures and/or resources and/or channels for exchanging communications. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu *15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

The subframes described above with reference to FIGS. 2A-2D may be used for communication by the UE 104 and the base station 108, as described above with reference to FIG. 1.

Figure 3:
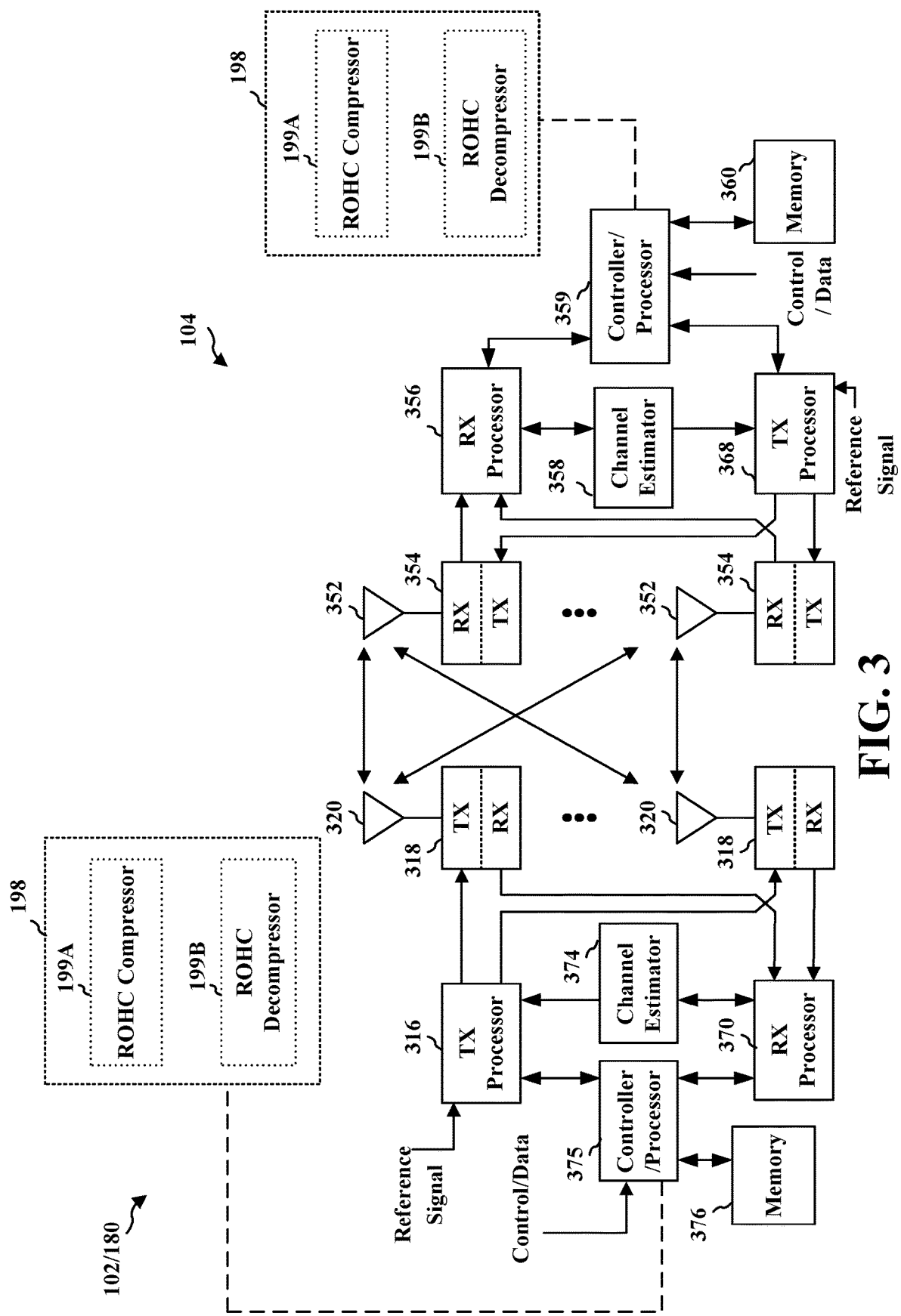
FIG. 3 is a diagram illustrating an example of a base station and a user equipment in an access network.

FIG. 3 is a block diagram of hardware and/or logical components of the base station 102 or 180 in communication with the UE 104 in the wireless communication system 100. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At the UE 104, least one of the TX processor 368, the RX processor 356, and the controller/processor 359 may be configured to perform aspects in connection with 198 of FIG. 1. For example, the controller/processor 359 may include the ROHC unit 198 as described above with reference to FIG. 1. Similarly, at the base station 102 or 180, at least one of the TX processor 316, the RX processor 370, and the controller/processor 375 may be configured to perform aspects in connection with 198 of FIG. 1. For example, the controller/processor 375 may include the ROHC unit 198 as described above with reference to FIG. 1.

For communicating using ROHC between a transmitter device and a receiver device operating according to a wireless communication protocol, a compressor as well as a decompressor, should support common TCP compression profiles. However, in absence of a predefined list of TCP generic option compression profiles, a compression/decompression may fail when a TCP packet having a TCP generic option identifier corresponding to an ROHC protocol technique is present in the uncompressed TCP packet but the compressor does not have support for the ROHC protocol technique corresponding to the TCP generic option identifier, resulting into a failure in communication of the TCP packet. Even upon re-transmission, the TCP packet may be dropped when it is re-transmitted by the TCP network stack in the transmitter device, which may eventually result in a tear down of the TCP connection with the receiver device. Similarly, when the decompressor does not support an ROHC TCP generic option compression profile supported by the compressor, the decompression may fail and a negative feedback may be sent continuously, even when the TCP packet with the ROHC TCP generic option compression profile is re-transmitted, resulting in a TCP connection loss. Further, when continuous compression/decompression failures are detected, a network configuration may disable ROHC for a PDCP layer channel and subsequent TCP packets may be sent without any ROHC compression, which can result in increased bandwidth utilization, which is not desirable in networks such as 5G NR where desired data rates are very high.

A process of enhancing ROHC TCP capabilities may be utilized to indicate ROHC TCP generic option protocol techniques supported by a UE (e.g., the UE 104 as described above with reference to FIG. 1) and a base station (e.g., the BS 102/180 as described above with reference to FIG. 1) so that a compressor can use a suitable ROHC protocol technique (e.g., standard compression profile, an option compression profile or an uncompressed profile) for compression instead of dropping the TCP packet. Similarly, based on such indication or negotiation, a decompressor can decompress a received TCP packet without decompression failures. The method of enhancing ROHC TCP generic option capabilities is further described below with reference to FIGS. 3-11.

Figure 4:
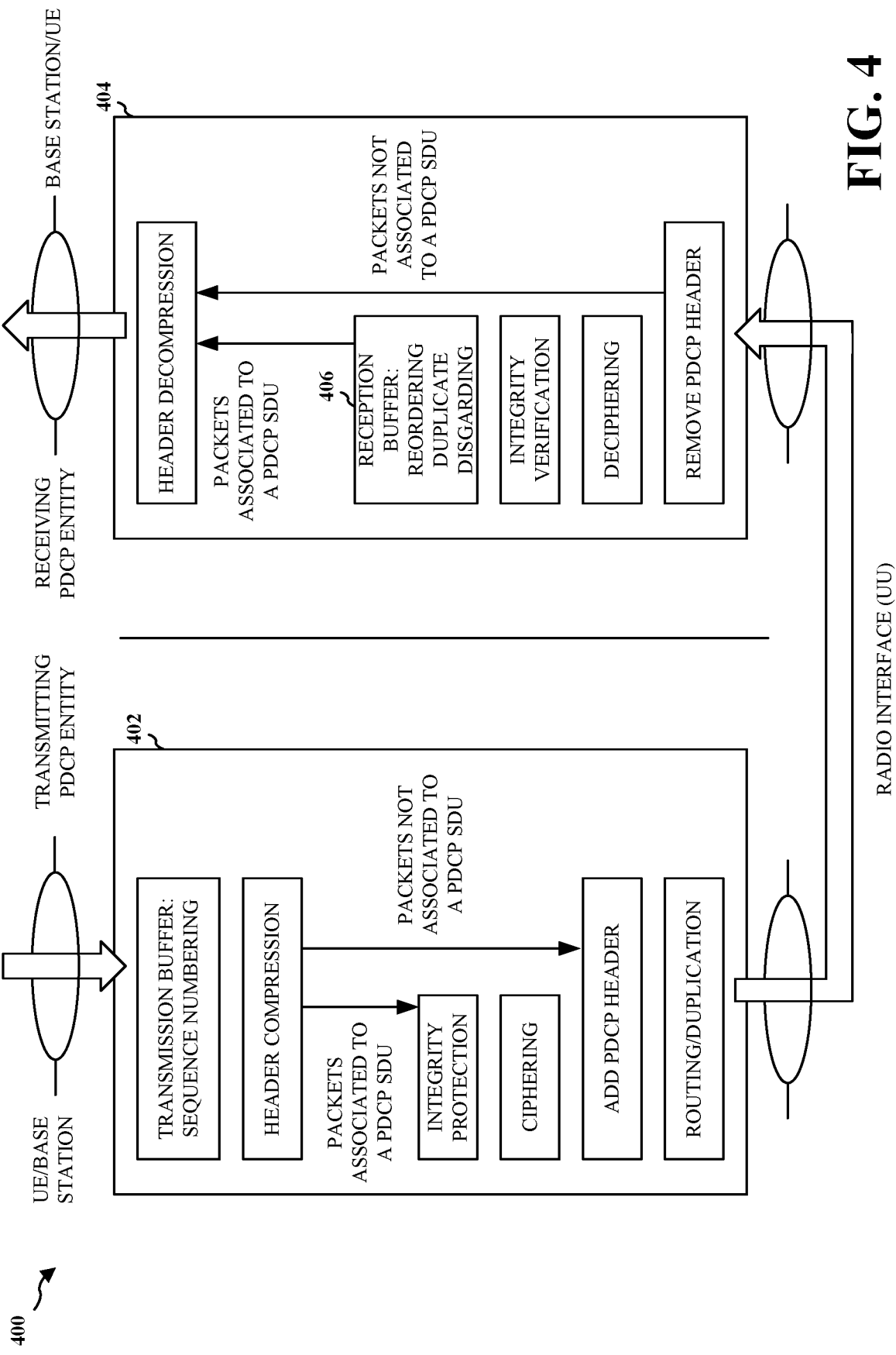
FIG. 4 is a diagram illustrating an example of a PDCP architecture.

FIG. 4 is an example diagram 400 illustrating PDCP architecture between a transmitting PDCP entity 402 (e.g., transmitter side) and a receiving PDCP entity 404 (e.g., receiver side). A UE and/or a base station may be associated with both a transmitting PDCP entity and a receiving PDCP entity. In FIG. 4, packets (e.g., data blocks) coming into the transmitting PDCP entity 402 may first go through sequence numbering, where the transmitting PDCP entity 402 may add a sequence number (SN) for each incoming packet. The receiving PDCP entity 404 may use the SN to identify whether the packets delivered by the transmitting PDCP entity 402 are complete, in order and/or missing, etc. The packets then go through header compression (e.g., this may only apply to IP packet data and not signaling messages). Then the transmitting PDCP entity 402 may apply integrity protection to the compress packets (e.g., packets associated to a PDCP SDU) and/or cipher the compressed packets. After that, the transmitting PDCP entity 402 may add PDCP header to the compressed packets, and transmit the compressed packets with PDCP header to the receiving PDCP entity 404 (e.g., via a Uu radio interface).

After receiving the compressed packets with the PDCP header from the transmitting PDCP entity 402, the receiving PDCP entity 404 may remove the PDCP header from the packets, decipher the packets, and/or verify the integrity of the packets. As shown at block 406, the receiving PDCP entity 404 may reorder the packets (e.g., based on their SN) and discard any duplicate packet(s). The packets then go through header decompression.

Figure 5:
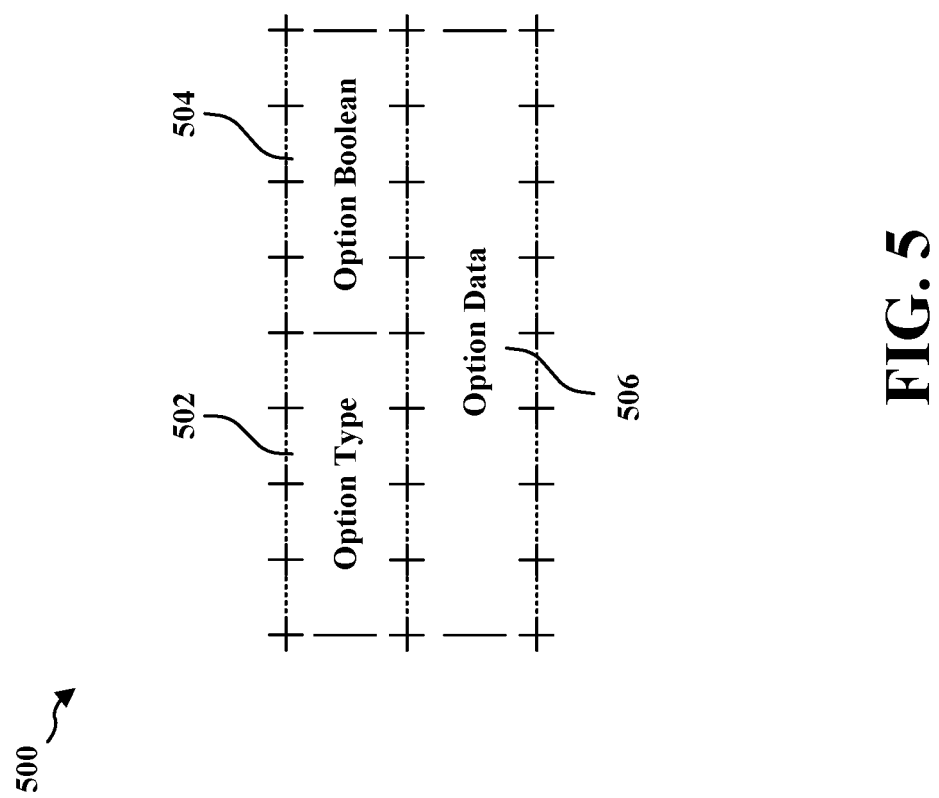
FIG. 5 is a diagram illustrating an example field format of a packet to indicate supported ROHC generic options usable by a compressor and a decompressor.

FIG. 5 is a diagram illustrating an example field format 500 of a PDCP configuration that may be included to indicate one or more supported ROHC options usable by the ROHC compressor 199A and ROHC decompressor 199B. In some aspects, the field format 500 may form at least a portion of a list of supported TCP options included within the PDCP configuration. The field format 500 includes one or more fields including: option type field 502, option Boolean field 504, and option data field 506. For example, the option type field 502 may include a value indicating TCP ROHC options supported by the ROHC decompressor 199B and/or the ROHC compressor 199A. For instance, the option type field 502 may identify a TCP option identifier assigned to a current ROHC protocol technique or profile as below:
1. ROHC_NOP=TCP_OPT_NOP
2. ROHC_EOL=TCP_OPT_EOL
3. ROHC_MSS=TCP_OPT_MSS
4. ROHC_WINDOW_SCALE=TCP_OPT_WSCALE
5. ROHC_TIMESTAMP=TCP_OPT_TS
6. ROHC_SACK-PERMITTED=TCP_OPT_SACK_PERMITTED
7. ROHC_SACK=TCP_OPT_SACK
8. ROHC_GENERIC_OPTIONS=TCP_OPT_GENERIC Apart from above well-known options mentioned above, all remaining options are considered a "GENERIC" option. For example, different TCP generic options are listed as below:
1. ROHC_TCP_GEN_OPT_TRAILER_CHECKSUM
2. ROHC_TCP_GEN_OPT_SCPS_CAPABILITIES
3. ROHC_TCP_GEN_OPT_SELECTIVE_NACKS
4. ROHC_TCP_GEN_OPT_RECORD_BOUNDARIES
5. ROHC_TCP_GEN_OPT_CORRUPTION_EXPERIENCED
6. ROHC_TCP_GEN_OPT_SNAP
7. ROHC_TCP_GEN_OPT_COMPRESSION_FILTER
8. ROHC_TCP_GEN_OPT QUICK_START_RESPONSE
9. ROHC_TCP_GEN_OPT_USER_TIMEOUT
10. ROHC_TCP_GEN_OPT_TCP_AUTHENTICATION
11. ROHC_TCP_GEN_OPT_MULTIPATH_TCP
12. ROHC_TCP_GEN_OPT_FAST_COOKIE.

The option boolean field 504 may include a value indicating whether the option type identified in the option type field 502 is set. For instance, a value of 'TRUE' in the option boolean field 504 may indicate that the option type field 502 is set (or is supported by the peer-side decompressor). Otherwise, a value of 'FALSE' in the option boolean field 504 may indicate that the option type field 502 is not set (or not supported by the peer-side decompressor). The option data field 506 may be populated with a bitmask of values identifying the set of one or more supported ROHC TCP options._In one example, a bitmask of the supported TCP ROHC options may be indicated by hexadecimal codes (supported TCP option=code) as below:

1. ROHC_TCP_GEN_OPT_TRAILER_CHECKSUM_BITMASK=0x0001
2. ROHC_TCP_GEN_OPT_SCPS_CAPABILITIES_BITMASK=0x0002
3. ROHC_TCP_GEN_OPT_SELECTIVE_NACKS_BITMASK=0x0004
4. ROHC_TCP_GEN_OPT_RECORD_BOUNDARIES_BITMASK=0x0008
5. ROHC_TCP_GEN_OPT_CORRUPTION_EXPERIENCED_BITMASK=0x0010
6. ROHC_TCP_GEN_OPT_SNAP_BITMASK=0x0020
7. ROHC_TCP_GEN_OPT_COMPRESSION_FILTER_BITMASK=0x0040
8. ROHC_TCP_GEN_OPT_QUICK_START_RESPONSE_BITMASK=0x0080
9. ROHC_TCP_GEN_OPT_USER_TIMEOUT_BITMASK=0x0100
10. ROHC_TCP_GEN_OPT_TCP_AUTHENTICATION_BITMASK=0x0200
11. ROHC_TCP_GEN_OPT_MULTIPATH_TCP_BITMASK=0x0400
12. ROHC_TCP_GEN_OPT_FAST_COOKIE_BITMASK=0x0800.

For example, in case where the ROHC decompressor 199B supports only options 1 and 2 above, the option data field 506 may be populated with a bitmask of 0x0003. Similarly, when the ROHC decompressor 199B supports all the options, then a separate unique bitmask may be used, such as a bitmask of 0x0FFF. In the above examples, the option data field 506 includes a bitmask that represents a unique two byte long summation of pre-defined bitmasks (hexadecimal codes) of the respective options, however, other similar schemes for the bitmask in the option data field 506 may be utilized in the field format 500.

As such, the ROHC compressor 199A being aware of supported TCP options can use either the ROHC TCP profile (e.g., having identifier (0x0006)) for compressing the header of a received TCP packet or the ROHC UNCOMPRESSED profile (e.g., having identifier (0x0000)) for skipping header compression based on whether a TCP option(s) present in an uncompressed header of a received TCP packet is supported or not by the ROHC decompressor 199B.

Figure 6:
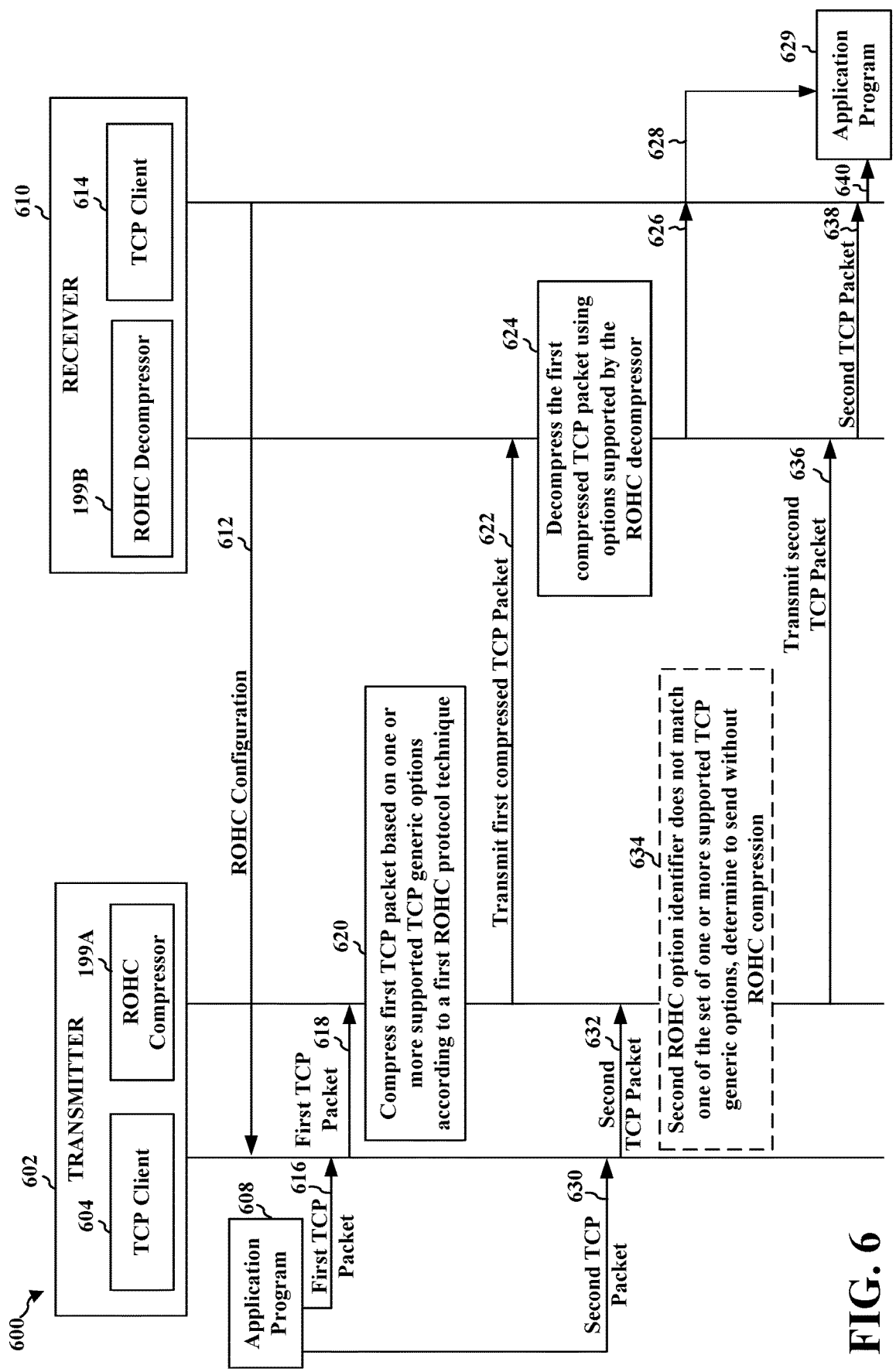
FIG. 6 is a flow diagram illustrating operations at a transmitter and a receiver of a wireless communication system and message exchanges between the transmitter and the receiver according to one or more implementations of the subject technology.

FIG. 6 is a flow diagram 600 illustrating operations at the transmitter device 602 and the receiver device 610 of a wireless communication system, and message exchanges between the transmitter device 602 and the receiver device 610 according to one or more implementations of a wireless communication system.

At 612, the TCP client 614 on the receiver device sends an ROHC configuration. For example, the TCP client 614 can transmit an RRC reconfiguration message that includes a PDCP configuration. The PDCP configuration may include one or more information elements that indicate a listing of header generic options that are supported between the transmitter device 602 and the receiver device 610. In an example implementation of the flow diagram 600, if a TCP packet contains a TCP generic option that is supported by both the ROHC compressor 199A and the ROHC decompressor 199B, the ROHC compressor 199A can make a choice of ROHC profiles to be used for compression of a next TCP packet. In some examples, the listing of header generic options includes a plurality of supported TCP generic options. For example, each of the plurality of generic options in the listing may correspond to a different one of a plurality of supported TCP generic options. In this regard, the ROHC compressor 199A may be configured to support one or more of the plurality of generic options provided in the configuration listing.

At 616, the TCP client 604 may receive a first TCP packet, from an application program 608 executing on the transmitter device 602, for transmission to the receiver device 610. At 618, the TCP client 604 may send the first TCP packet to the ROHC compressor 199A. The first TCP packet may include a first ROHC option identifier that indicates a first ROHC protocol technique for compression of the TCP packet. For example, the first TCP packet may include one or more generic option identifiers. The ROHC compressor 199A may determine whether the one or more generic option identifiers indicated in the first TCP packet are supported by the ROHC decompressor 199B based on whether the one or more generic option identifiers correspond to at least one of the supported TCP generic options indicated in the listing. If the ROHC compressor 199A determines that the one or more generic option identifiers corresponds to at least one of the supported TCP generic options of the listing, then the ROHC compressor 199A can conclude that the one or more generic option identifiers indicate a ROHC generic option protocol technique that is supported by the ROHC decompressor 199B.

At 620, the ROHC compressor 199A may compress the first TCP packet using the standard ROHC protocol technique corresponding to the first ROHC option identifier to create a first compressed TCP packet. In other words, the ROHC compressor 199A may utilize the ROHC TCP profile having identifier (0x0006) to compress the first TCP packet based on the corresponding generic options. At 622, the ROHC compressor 199A may transmit the first compressed TCP packet to the receiver device 610. In one implementation, the ROHC compressor 199A may send the first compressed TCP packet to one or more components on the transmitter device 602 for transmitting the first compressed TCP packet to the receiver device 610.

At 624, the ROHC decompressor 199B receives and, based on the supported generic options as configured by the listing of supported TCP generic options, decompresses the first compressed TCP packet to create a first decompressed TCP packet. In one implementation, one or more components on the receiver device 610 may receive the first compressed TCP packet from the transmitter device 602 and send the first compressed TCP packet to the ROHC decompressor 199B for decompression. At 626, the ROHC decompressor 199B may send the first decompressed TCP packet to the TCP client 614. In one implementation, the ROHC decompressor 199B may send the first decompressed TCP packet to one or more components of the receiver device 610. At 628, the ROHC decompressor 199B may send the first decompressed TCP packet to an application program 629 on the receiver device.

In one or more implementations, the receiver device 610 may send an acknowledgement for successful receipt of the first TCP packet to the transmitter device 602 (not shown). For example, one or more components of the receiver device 610 may send the acknowledgement for successful receipt of the first TCP packet to one or more components of the transmitter device 602.

At 630, the TCP client 604 receives a second TCP packet for transmission to the receiver 610. In one implementation, the second TCP packet may be received from the application program 608 and the second TCP packet may be a second packet of the application program 609 to be transmitted to the receiver 610.

It should be understood that the second TCP packet 630 may be sent by the application program 608, but with a different, unsupported ROHC TCP generic option. In any case, at 632, the TCP client 604 sends the second TCP packet to the ROHC compressor 199A.

At 634, the ROHC compressor 199A may identify that the second ROHC option identifier corresponds to an unsupported ROHC compressor option by determining that the second ROHC option identifier does not correspond to one of the TCP generic options listed in the configuration listing. For example, the ROHC compressor 199A may identify that the second ROHC option identifier does not match with one of the set of one or more generic option identifiers (corresponding to the set of one or more supported ROHC options at the ROHC decompressor 199B) provided in the listing. In other aspects, the ROHC compressor 199A may determine that the second ROHC option identifier is not supported between the ROHC compressor 199A and the ROHC decompressor 199B based on a Boolean value of a corresponding generic option identifier in the listing (e.g., Boolean value=FALSE). Consequently, due to the unsupported nature of the identified generic option and to avoid decompression issues at the ROHC decompressor 199B, ROHC compressor 199A may determine to not apply ROHC TCP compression to the second TCP packet. For instance, in this case, the ROHC compressor 199A may apply the ROHC UNCOMPRESSED profile (e.g., having identifier (0x0000)) for skipping header compression in this instance.

At 636, the ROHC compressor 199A may transmit the second TCP packet as an uncompressed TCP packet to the receiver device 610. At 638, the ROHC decompressor 199B may receive the second TCP packet as the uncompressed TCP packet and send the second TCP packet to the TCP client 614. At 640, the TCP client 614 may send the second TCP packet to the application program 629 on the receiver device 610.

Figure 7:
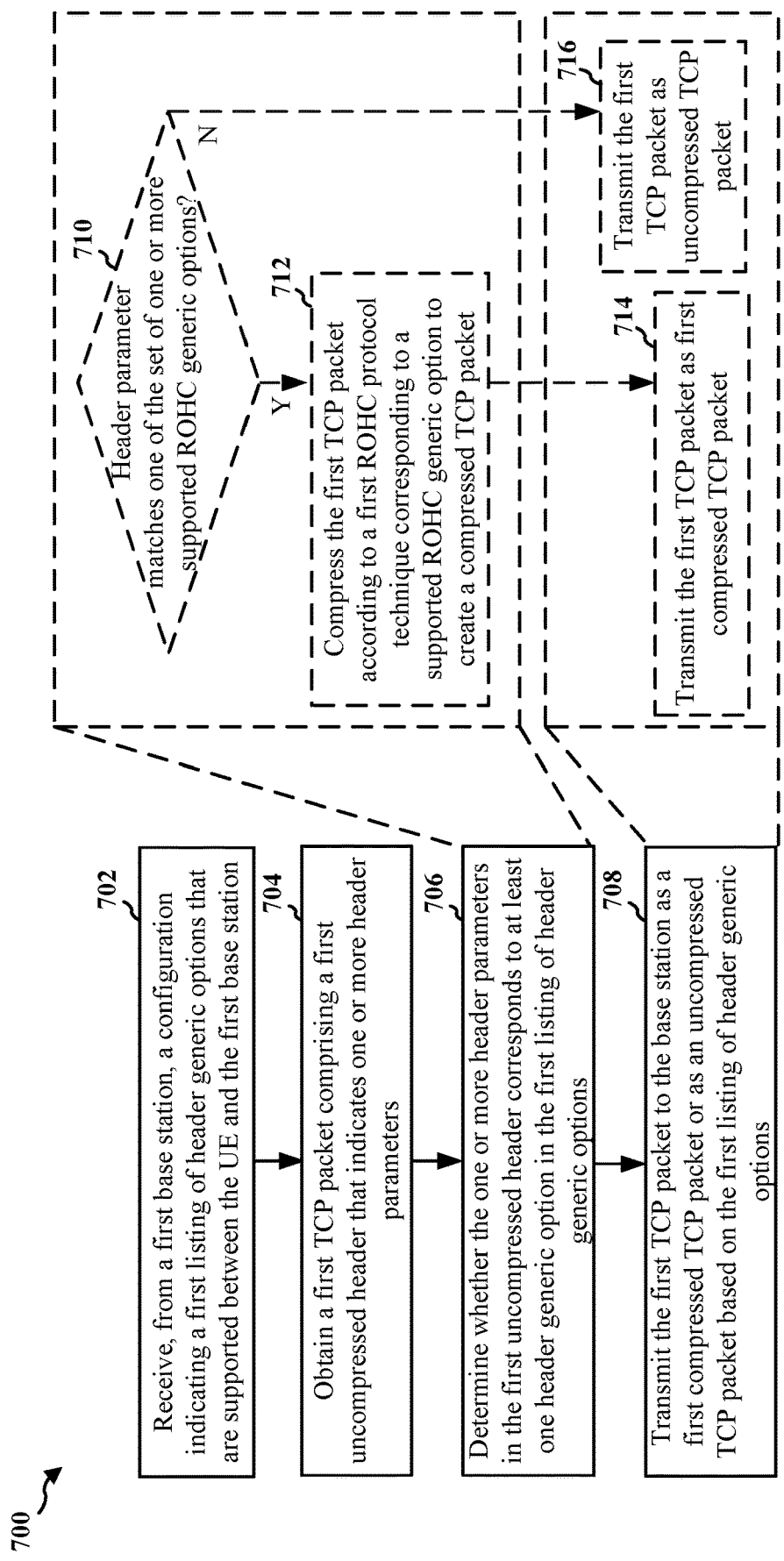
FIG. 7 is a flowchart of a process of wireless communication at a transmitter according to one or more implementations of the subject technology.

FIG. 7 is a flowchart of a process 700 of wireless communication at a transmitter. The transmitter may be similar to the transmitter device 602 as described above with reference to FIG. 6. The process 700 may be performed by a UE (e.g., the UE 104; the apparatus 1102, which may include memory, a cellular baseband processor 1104, and one or more components configured to perform the process 700). As illustrated, the process 700 includes a number of enumerated steps, but embodiments of the process 700 may include additional steps before, after, and in between the enumerated steps. In some embodiments, one or more of the enumerated steps may be omitted or performed in a different order. Optional aspects are illustrated with a dashed line. The process 700 enables a wireless communication device to facilitate vehicle-mounted relays as secondary cell involving dual connectivity with Uu direct link connections and sidelink-based relays between UEs and a core network.

At 702, the UE receives, from a base station, a downlink configuration indicating a configuration listing of header generic options that are supported between the UE and the base station. For example, the transmitter 602 may receive the downlink configuration from the receiver 610 as described above in reference to FIG. 6. In some aspects, the downlink configuration is an ROHC configuration. In particular, the ROHC configuration may be sent from the receiver 610 to the transmitter 602 in an RRC reconfiguration message.

At 704, the UE obtains a first TCP packet for transmission to the base station. For example, the transmitter 602 may obtain the first TCP packet at 618 as described above with reference to FIG. 6. In some aspects, the first TCP packet includes an uncompressed header that indicates one or more header parameters.

At 706, the UE determines whether the one or more header parameters in the first uncompressed header corresponds to at least one header generic option in the configuration listing of supported header generic options. For example, the transmitter 602 may determine a match with the configuration listing of supported header generic options at 620 as described above with reference with FIG. 6.

At 708, the UE transmits the first TCP packet to the base station as a first compressed TCP packet or as an uncompressed TCP packet based on the configuration listing of supported header generic options. For example, the transmitter 602 may transmit the first TCP packet to the receiver device as the first TCP compressed packet at 622 as described above with reference to FIG. 6. The transmitter 602 may send the first TCP packet to the receiver device as the uncompressed packet at 636 as described above with reference to FIG. 6.

Optionally, in one implementation, the UE may perform the operations at blocks 710 and 712 in addition or in alternate to the operations at block 706. Optionally, in one implementation, the UE may perform the operations at blocks 714 and 716 in addition or in alternate to the operations at block 708.

At 710, the UE determines whether the header parameter (e.g., TCP generic option identifier) matches one of the set of one or more supported TCP generic options for the receiver device as listed in the configuration listing. For example, the transmitter 602 may determine that the header parameter matches one of the set of one or more supported TCP generic options for the receiver device 610 at 620, as described above with reference to FIG. 6.

On determining that the header parameter in the first TCP packet matches one of the set of one or more supported TCP generic options as provided in the configuration listing, at 712, the UE compresses the first TCP packet according to a first ROHC protocol technique corresponding to the supported TCP generic option to create a compressed TCP packet. For example, the transmitter 602 may compress the first TCP packet according to the first ROHC protocol technique corresponding to the supported TCP generic option to create the compressed TCP packet at 620, as described above with reference to FIG. 6.

At 714, the UE sends the first TCP packet as a first compressed TCP packet. For example, the transmitter 602 may send the first TCP packet as the first compressed TCP packet at 622, as described above with reference to FIG. 6.

On determining that the header parameter in the first TCP packet does not match one of the set of one or more supported TCP generic options as provided in the configuration listing, at 716, the UE may transmit the first TCP packet as an uncompressed TCP packet. For example, the transmitter 602 may transmit the first TCP packet as the uncompressed TCP packet at 636 as described above with reference to FIG. 6.

Figure 8:
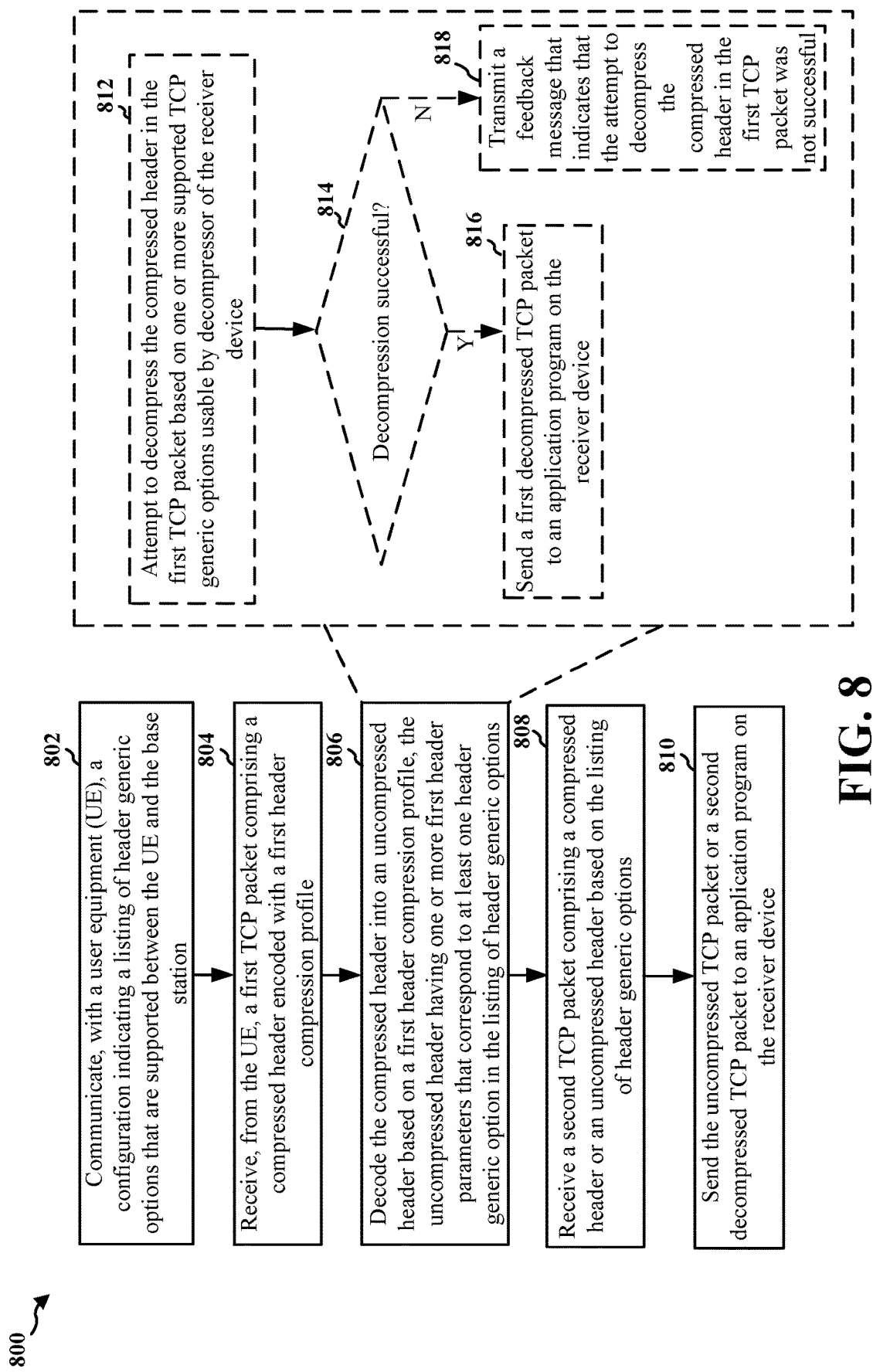
FIG. 8 is a flowchart of a process of wireless communication at a receiver according to one or more implementations of the subject technology.

FIG. 8 is a flowchart of a process 800 of wireless communication at a receiver. The receiver may be similar to the receiver device 610 as described above with reference to FIG. 6. One or more operations described in the process 800 may be performed by an ROHC decompressor, similar to the ROHC decompressor 199B as described above with reference to FIGS. 1-6. One or more operations described in the process 800 may be performed by an ROHC compressor, similar to the ROHC compressor 199A as described above with reference to FIGS. 1-6. Further, one or more operations described in the process 800 may be performed by one or more components of the transmitter. The process 800 may be performed by a base station (e.g., the BS 102, 180; the apparatus 1102, which may include memory, a cellular baseband processor 1204, and one or more components configured to perform the 800). As illustrated, the process 800 includes a number of enumerated steps, but embodiments of the process 800 may include additional steps before, after, and in between the enumerated steps. In some embodiments, one or more of the enumerated steps may be omitted or performed in a different order. Optional aspects are illustrated with a dashed line. The process 800 enables a wireless communication device to facilitate network coding for handovers involving dual connectivity with Uu direct link connections and sidelink-based relays between UEs and a core network. Further, one or more operations described in the process 800 may be performed by one or more components of the receiver.

At 802, the base station communicates, with a UE, a configuration indicating a listing of header generic options that are supported between the UE and the base station. For example, the transmitter 602 transmits the ROHC configuration that indicates the configuration listing of supported TCP generic options at 612 as described above with reference to FIG. 6.

At 804, the base station, receives a first TCP packet from the UE. For example, the receiver device 610 may receive the first TCP packet that includes a compressed header encoded with a first header compression profile from the transmitter device 602 at 622, as described above with reference to FIG. 6.

At 806, the base station decodes the first compressed header into an uncompressed header based on a first header compression profile. For example, the receiver device 610 attempts to decompress the first compressed header based on one or more supported TCP generic options usable by the ROHC decompressor 199B of the receiver device 610 at 624, as described above with reference to FIG. 6. In some aspects, the uncompressed header includes one or more header parameters that correspond to at least one header generic option in the configuration listing of supported TCP generic options.

At 808, the base station receives a second TCP packet that includes a compressed header or an uncompressed header based on the configuration listing of supported TCP generic options. For example, the receiver device 610 receives the second TCP packet that includes an uncompressed header at 636, as described above with reference to FIG. 6. In another example, the receiver device 610 receives the second TCP packet that includes a compressed header at 622, as described above with reference to FIG. 6.

At 810, the base station sends the uncompressed TCP packet or the second decompressed TCP packet to an application program on the receiver device. For example, the receiver device 610 sends the uncompressed TCP packet to the application program on the receiver device 610 at 640, as described above with reference to FIG. 6. The receiver device 610 sends the decompressed TCP packet to an application program on the receiver device 610 at 628, as described above with reference to FIG. 6.

Optionally, in one implementation, the base station may perform the operations at blocks 812, 814, 816 and/or 818 in addition to or in alternate to the operations at block 806.

At 812, the base station attempts to decompress the compressed header in the first TPP packet based on one or more supported TCP generic options usable by the decompressor of the base station. For example, the receiver device 610 decompresses the compressed header of the received TCP packet at 624, as described above with reference to FIG. 6.

At 814, the base station determines if the decompression was successful. For example, the receiver device 610 may determine whether the decompression was successful at 624, as described above with reference to FIG. 6.

At 816, on determining that the decompression was successful, the base station sends the first decompressed TCP packet to an application program on the receiver device. For example, the receiver device 610 sends the first decompressed packet to the application program 629 at 640, as described above with reference to FIG. 6.

In some implementations, in determining that the decompression was not successful, at 818, the base station may transmit a feedback message that indicates that the attempt to decompress the compressed header in the TCP packet was not successful.

The above described technique in FIGS. 1-7 allows a transmitter and a receiver in a wireless communication system to exchange TCP ROHC supported options at a decompressor using a predefined configuration listing exchanged between a base station and a UE, and enables a UE-side compressor to determine a suitable profile (ROHC protocol compressed or uncompressed profile or technique) to apply to a TCP packet. The technique avoids packet losses and decoding failure of packets by reducing decompression failures.

Figure 9:
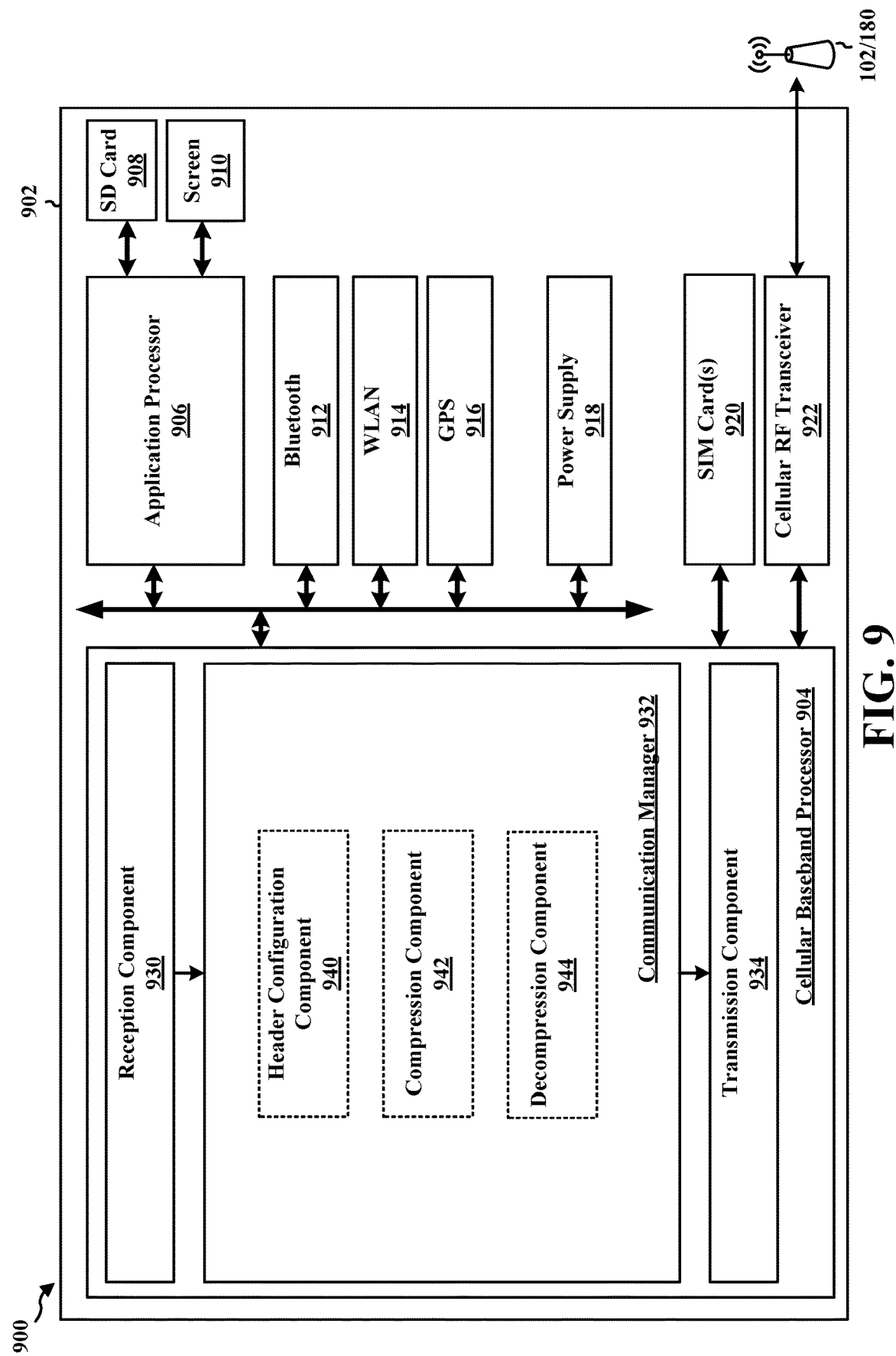
FIG. 9 is a diagram illustrating an example of a hardware implementation for an example apparatus.

FIG. 9 is a diagram 900 illustrating an example of a hardware implementation for an apparatus 902. The apparatus 902 may be a UE or other wireless device that communicates based on Uu direct link and/or sidelink. The apparatus 902 includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with other wireless devices, such as a UE 104 and/or base station 102/180. The cellular baseband processor 904 may include a computer-readable medium/memory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 104 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire wireless device (e.g., see the UE 104 of FIG. 3) and include the additional modules of the apparatus 902.

The communication manager 932 includes a header configuration component 940, a compression component 942 and/or a decompression component 944 configured to perform the aspects described in connection with a process in FIG. 7. The apparatus is illustrated as including components to perform the process of FIG. 7, because the wireless device may operate as a transmitting device at times and may operate as a receiving device at other times.

The apparatus 902 may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 902 may further include means for receiving, from a first base station, a configuration indicating a first listing of header generic options that are supported between the UE and the first base station. For example, the header configuration 940, through coordination with the reception component 930, may receive the configuration. The apparatus 902 also includes means for obtaining a first packet comprising a first uncompressed header that indicates one or more header parameters. For example, the compression component 942 may obtaining the first packet with the first uncompressed header. The apparatus 902 also includes means for determining whether the one or more header parameters in the first uncompressed header corresponds to at least one header generic option in the first listing of header generic options. For example, the compression component 942 may determine whether the first uncompressed header includes a supported header generic option. The apparatus 902 also includes means for communicating, with the first base station, the first packet having a first compressed header based on a first header compression profile when the one or more header parameters in the first uncompressed header corresponds to the at least one header generic option in the first listing of header generic options. For example, the compression component 942 may transmit, through coordination with the transmission component 934, the first packet with the first compressed header. The apparatus 902 also includes means for communicating, with the first base station, the first packet having the first uncompressed header based on a second header compression profile different than the first header compression profile when the one or more header parameters in the first uncompressed header does not correspond to the at least one header generic option in the first listing of header generic options. For example, the compression component 942 may transmit, through coordination with the transmission component 934, the first packet with the first uncompressed header.

In some aspects, the apparatus 902 includes means for receiving, from the first base station over a downlink channel, a radio resource control reconfiguration message that includes a packet data convergence protocol configuration information element that indicates the first listing of header generic options.

In some aspects, the apparatus 902 includes means for determining whether the one or more header parameters corresponds to at least one of the plurality of TCP generic options. The apparatus 902 includes means for determining whether the at least one of the plurality of TCP generic options is supported between the UE and the first base station based on a first Boolean value or a second Boolean value different than the first Boolean value, when the one or more header parameters corresponds to the at least one of the plurality of TCP generic options.

In some aspects, the apparatus 902 includes means for determining that the at least one of the plurality of TCP generic options is supported between the UE and the first base station based on the first Boolean value. The apparatus 902 includes means for selecting the first header compression profile between the first header compression profile and the second header compression profile. The apparatus 902 also includes means for compressing the first uncompressed header into the first compressed header based on the first header compression profile.

In some aspects, the apparatus 902 includes means for determining that the at least one of the plurality of TCP generic options is not supported between the UE and the first base station based on the second Boolean value, when the one or more header parameters corresponds to the at least one of the plurality of TCP generic options. The apparatus 902 includes means for selecting the second header compression profile between the first header compression profile and the second header compression profile. The apparatus 902 also includes means for providing the first uncompressed header for transmission based on the second header compression profile.

In some aspects, the apparatus 902 includes means for determining that the at least one of the plurality of TCP generic options is not supported between the UE and the first base station when the one or more header parameters do not correspond to the at least one of the plurality of TCP generic options. The apparatus 902 includes means for selecting the second header compression profile between the first header compression profile and the second header compression profile. The apparatus 902 also includes means for providing the first uncompressed header for transmission based on the second header compression profile.

In some aspects, the apparatus 902 includes means for establishing a transmission control protocol connection between the UE and the first base station. The apparatus 902 also includes means for communicating, with the first base station, a TCP data transmission over the TCP connection, wherein the TCP data transmission comprises the first packet with one of the first compressed header or the first uncompressed header.

In some aspects, the apparatus 902 includes means for determining an occurrence of a radio link failure event in a connection between the UE and the first base station. The apparatus 902 includes means for communicating, with the first base station, an indication of the RLF event. The apparatus 902 also includes means for receiving, from the first base station, a radio resource control reconfiguration message based on the indication of the RLF event, the RRC reconfiguration message comprising a packet data convergence protocol configuration information element that indicates the first listing of header generic options.

In some aspects, the apparatus 902 includes means for determining an occurrence of a radio link failure event in a connection between the UE and the first base station. The apparatus 902 includes means for communicating, with the first base station, an indication of the RLF event. The apparatus 902 includes means for receiving, from the first base station, a radio resource control reconfiguration message based on the indication of the RLF event, wherein the RRC reconfiguration message comprises an indication to the UE to initiate a handover from the first base station to a second base station. The apparatus 902 includes means for initiating the handover from the first base station to the second base station. The apparatus 902 also includes means for receiving, from the second base station, a radio resource control reconfiguration message, the RRC reconfiguration message comprising a packet data convergence protocol configuration information element that indicates a second listing of header generic options that are supported between the UE and the second base station.

In some aspects, the apparatus 902 includes means for obtaining a second packet comprising a second uncompressed header that indicates one or more header parameters. The apparatus 902 includes means for determining whether the one or more header parameters in the second uncompressed header corresponds to at least one header generic option in the second listing of header generic options. The apparatus 902 includes means for communicating, with the second base station, the second packet having a second compressed header based on the first header compression profile when the one or more header parameters in the second uncompressed header corresponds to the at least one header generic option in the second listing of header generic options. The apparatus 902 also includes means for communicating, with the second base station, the second packet having the second uncompressed header based on the second header compression profile when the one or more header parameters in the second uncompressed header does not correspond to the at least one header generic option in the second listing of header generic options.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 10 is a diagram 1000 illustrating an example of a hardware implementation for an apparatus 1002. The apparatus 1002 may be a base station or other wireless device that communicates based on downlink/uplink. The apparatus 1002 includes a cellular baseband processor 1004 (also referred to as a modem) coupled to a RF transceiver 1024, a processor 1020 and a memory 1022. The cellular baseband processor 1004 communicates through the RF transceiver 1024 with other wireless devices, such as a UE 104. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The processor 1020 is responsible for general processing, including the execution of software stored on the computer-readable medium/memory 1022. The software, when executed by the processor 1020, causes the apparatus 1002 to perform the various functions described supra for any particular apparatus. The computer-readable medium/memory 1022 may also be used for storing data that is manipulated by the processor 1020 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the base station 102/180 and may include the memory 376 and/or at least one of the TX processor 316, the RX processor 370, and the controller/processor 375. In one configuration, the apparatus 1002 may be a modem chip and include just the baseband processor 1004, and in another configuration, the apparatus 1002 may be the entire wireless device (e.g., see the base station 102/180 of FIG. 3) and include the additional modules of the apparatus 1002.

The communication manager 1032 includes a header configuration component 1040, a compression component 1042 and/or a decompression component 1044 configured to perform the aspects described in connection with methods in FIG. 9. The apparatus is illustrated as including components to perform the method of FIG. 9, because the wireless device may operate as a transmitting device at times and may operate as a receiving device at other times. In other examples, the apparatus 1002 may include components for the method of FIG. 9.

The apparatus 1002 may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for communicating, with a user equipment (UE), a configuration indicating a listing of header generic options that are supported between the UE and the base station. The apparatus 1002 may further include means for receiving, from the UE, a first packet comprising a compressed header encoded with a first header compression profile. The apparatus 1002 also may include means for decoding the compressed header into an uncompressed header based on the first header compression profile, the uncompressed header having one or more first header parameters that correspond to at least one header generic option in the listing of header generic options.

In some aspects, the apparatus 1002 includes means for receiving, from the UE, a second packet comprising an uncompressed header based on a second header compression profile, the uncompressed header having one or more second header parameters that do not correspond to the at least one header generic option in the listing of header generic options.

In some aspects, the apparatus 1002 includes means for transmitting, to the UE over a downlink channel, a radio resource control reconfiguration message that includes a packet data convergence protocol configuration information element that indicates the listing of header generic options.

In some aspects, the apparatus 1002 includes means for establishing a transmission control protocol connection between the UE and the base station. The apparatus 1002 includes means for communicating, with the UE, a TCP data transmission over the TCP connection, wherein the TCP data transmission comprises one or more of the first packet having the compressed header or the second packet having the uncompressed header.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and may be combined with aspects of other embodiments or teachings described herein, without limitation.

Aspect 1 is a method of wireless communication at a user equipment that includes receiving, from a first base station, a configuration indicating a first listing of header generic options that are supported between the UE and the first base station; obtaining a first packet comprising a first uncompressed header that indicates one or more header parameters; determining whether the one or more header parameters in the first uncompressed header corresponds to at least one header generic option in the first listing of header generic options; communicating, with the first base station, the first packet having a first compressed header based on a first header compression profile when the one or more header parameters in the first uncompressed header corresponds to the at least one header generic option in the first listing of header generic options; and communicating, with the first base station, the first packet having the first uncompressed header based on a second header compression profile different than the first header compression profile when the one or more header parameters in the first uncompressed header does not correspond to the at least one header generic option in the first listing of header generic options.

In Aspect 2, the method of Aspect 1 further includes that the receiving the configuration comprises: receiving, from the first base station over a downlink channel, a radio resource control reconfiguration message that includes a packet data convergence protocol configuration information element that indicates the first listing of header generic options.

In Aspect 3, the method of Aspect 1 or Aspect 2 further includes that the PDCP configuration information element further indicates the first header compression profile and the second header compression profile.

In Aspect 4, the method of any of Aspects 1-3 further includes that the first header compression profile corresponds to a transmission control protocol profile and the second header compression profile corresponds to an uncompressed profile.

In Aspect 5, the method of any of Aspects 1-4 further includes that the TCP profile and the uncompressed profile are associated with a robust header compression protocol.

In Aspect 6, the method of any of Aspects 1-5 further includes generating the first compressed header from the first uncompressed header with the first header compression profile.

In Aspect 7, the method of any of Aspects 1-6 further includes that the first listing of header generic options comprises a plurality of header generic options, and each of the plurality of header generic options corresponds to a different one of a plurality of transmission control protocol generic options.

In Aspect 8, the method of any of Aspects 1-7 further includes that the determining comprises: determining whether the one or more header parameters corresponds to at least one of the plurality of TCP generic options; and determining whether the at least one of the plurality of TCP generic options is supported between the UE and the first base station based on a first Boolean value or a second Boolean value different than the first Boolean value, when the one or more header parameters corresponds to the at least one of the plurality of TCP generic options.

In Aspect 9, the method of any of Aspects 1-8 further includes determining that the at least one of the plurality of TCP generic options is supported between the UE and the first base station based on the first Boolean value; selecting the first header compression profile between the first header compression profile and the second header compression profile; and compressing the first uncompressed header into the first compressed header based on the first header compression profile.

In Aspect 10, the method of any of Aspects 1-8 further includes determining that the at least one of the plurality of TCP generic options is not supported between the UE and the first base station based on the second Boolean value, when the one or more header parameters corresponds to the at least one of the plurality of TCP generic options; selecting the second header compression profile between the first header compression profile and the second header compression profile; and providing the first uncompressed header for transmission based on the second header compression profile.

In Aspect 11, the method of any of Aspects 1-8 further includes determining that the at least one of the plurality of TCP generic options is not supported between the UE and the first base station when the one or more header parameters do not correspond to the at least one of the plurality of TCP generic options; selecting the second header compression profile between the first header compression profile and the second header compression profile; and providing the first uncompressed header for transmission based on the second header compression profile.

In Aspect 12, the method of any of Aspects 1-11 further includes establishing a transmission control protocol connection between the UE and the first base station; and communicating, with the first base station, a TCP data transmission over the TCP connection, wherein the TCP data transmission comprises the first packet with one of the first compressed header or the first uncompressed header.

In Aspect 13, the method of any of Aspects 1-12 further includes determining an occurrence of a radio link failure event in a connection between the UE and the first base station; communicating, with the first base station, an indication of the RLF event; and receiving, from the first base station, a radio resource control reconfiguration message based on the indication of the RLF event, the RRC reconfiguration message comprising a packet data convergence protocol configuration information element that indicates the first listing of header generic options.

In Aspect 14, the method of any of Aspects 1-13 further includes determining an occurrence of a radio link failure event in a connection between the UE and the first base station; communicating, with the first base station, an indication of the RLF event; receiving, from the first base station, a radio resource control reconfiguration message based on the indication of the RLF event, wherein the RRC reconfiguration message comprises an indication to the UE to initiate a handover from the first base station to a second base station; initiating the handover from the first base station to the second base station; and receiving, from the second base station, a radio resource control reconfiguration message, the RRC reconfiguration message comprising a packet data convergence protocol configuration information element that indicates a second listing of header generic options that are supported between the UE and the second base station.

In Aspect 15, the method of any of Aspects 1-14 further includes obtaining a second packet comprising a second uncompressed header that indicates one or more header parameters; determining whether the one or more header parameters in the second uncompressed header corresponds to at least one header generic option in the second listing of header generic options; communicating, with the second base station, the second packet having a second compressed header based on the first header compression profile when the one or more header parameters in the second uncompressed header corresponds to the at least one header generic option in the second listing of header generic options; and communicating, with the second base station, the second packet having the second uncompressed header based on the second header compression profile when the one or more header parameters in the second uncompressed header does not correspond to the at least one header generic option in the second listing of header generic options.

Aspect 16 is a device including one or more processors and one or more memories in electronic communication with the one or more processors storing instructions executable by the one or more processors to cause a system or an apparatus to implement a method as in any of Aspects 1 to 15.

Aspect 17 is a system or apparatus including means for implementing a method or realizing an apparatus as in any of Aspects 1 to 15.

Aspect 18 is a non-transitory computer-readable medium storing instructions executable by one or more processors to cause the one or more processors to implement a method as in any of Aspects 1 to 15.

Aspect 19 is a method of wireless communication at a base station that includes communicating, with a user equipment, a configuration indicating a listing of header generic options that are supported between the UE and the base station; receiving, from the UE, a first packet comprising a compressed header encoded with a first header compression profile; and decoding the compressed header into an uncompressed header based on the first header compression profile, the uncompressed header having one or more first header parameters that correspond to at least one header generic option in the listing of header generic options.

In Aspect 20, the method of Aspect 19 further includes receiving, from the UE, a second packet comprising an uncompressed header based on a second header compression profile, the uncompressed header having one or more second header parameters that do not correspond to the at least one header generic option in the listing of header generic options.

In Aspect 21, the method of Aspect 19 or Aspect 20 further includes the communicating the configuration comprises: transmitting, to the UE over a downlink channel, a radio resource control reconfiguration message that includes a packet data convergence protocol configuration information element that indicates the listing of header generic options.

In Aspect 22, the method of any of Aspects 19-21 further includes that the PDCP configuration information element further indicates the first header compression profile and the second header compression profile.

In Aspect 23, the method of any of Aspects 19-22 further includes that the first header compression profile corresponds to a transmission control protocol profile and the second header compression profile corresponds to an uncompressed profile.

In Aspect 24, the method of any of Aspects 19-23 further includes that the TCP profile and the uncompressed profile are associated with a robust header compression protocol.

In Aspect 25, the method of any of Aspects 19-24 further includes establishing a transmission control protocol connection between the UE and the base station; and communicating, with the UE, a TCP data transmission over the TCP connection, wherein the TCP data transmission comprises one or more of the first packet having the compressed header or the second packet having the uncompressed header.

In Aspect 26, the method of any of Aspects 19-25 further includes that the listing of header generic options comprises a plurality of header generic options, and each of the plurality of header generic options corresponds to a different one of a plurality of transmission control protocol generic options.

Aspect 27 is a device including one or more processors and one or more memories in electronic communication with the one or more processors storing instructions executable by the one or more processors to cause a system or an apparatus to implement a method as in any of Aspects 19 to 26.

Aspect 28 is a system or apparatus including means for implementing a method or realizing an apparatus as in any of Aspects 19 to 26.

Aspect 29 is a non-transitory computer-readable medium storing instructions executable by one or more processors to cause the one or more processors to implement a method as in any of Aspects 19 to 26.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), the method comprising:
receiving, from a first base station, a configuration indicating a first listing of header generic options that are supported between the UE and the first base station;
obtaining a first packet comprising a first uncompressed header that indicates one or more header parameters;
determining whether the one or more header parameters in the first uncompressed header corresponds to at least one header generic option in the first listing of header generic options;
communicating, with the first base station, the first packet having a first compressed header based on a first header compression profile when the one or more header parameters in the first uncompressed header corresponds to the at least one header generic option in the first listing of header generic options; and
communicating, with the first base station, the first packet having the first uncompressed header based on a second header compression profile different than the first header compression profile when the one or more header parameters in the first uncompressed header does not correspond to the at least one header generic option in the first listing of header generic options.

2. The method of claim 1, wherein the receiving the configuration comprises:
receiving, from the first base station over a downlink channel, a radio resource control (RRC) reconfiguration message that includes a packet data convergence protocol (PDCP) configuration information element that indicates the first listing of header generic options.

3. The method of claim 2, wherein the PDCP configuration information element further indicates the first header compression profile and the second header compression profile.

4. The method of claim 1, wherein the first header compression profile corresponds to a transmission control protocol (TCP) profile and the second header compression profile corresponds to an uncompressed profile.

5. The method of claim 4, wherein the TCP profile and the uncompressed profile are associated with a robust header compression (ROHC) protocol.

6. The method of claim 1, further comprising:
generating the first compressed header from the first uncompressed header with the first header compression profile.

7. The method of claim 1, wherein:
the first listing of header generic options comprises a plurality of header generic options, and
each of the plurality of header generic options corresponds to a different one of a plurality of transmission control protocol (TCP) generic options.

8. The method of claim 7, wherein the determining comprises:
determining whether the one or more header parameters corresponds to at least one of the plurality of TCP generic options; and
determining whether the at least one of the plurality of TCP generic options is supported between the UE and the first base station based on a first Boolean value or a second Boolean value different than the first Boolean value, when the one or more header parameters corresponds to the at least one of the plurality of TCP generic options.

9. The method of claim 8, further comprising:
determining that the at least one of the plurality of TCP generic options is supported between the UE and the first base station based on the first Boolean value;
selecting the first header compression profile between the first header compression profile and the second header compression profile; and
compressing the first uncompressed header into the first compressed header based on the first header compression profile.

10. The method of claim 8, further comprising:
determining that the at least one of the plurality of TCP generic options is not supported between the UE and the first base station based on the second Boolean value, when the one or more header parameters corresponds to the at least one of the plurality of TCP generic options;
selecting the second header compression profile between the first header compression profile and the second header compression profile; and
providing the first uncompressed header for transmission based on the second header compression profile.

11. The method of claim 8, further comprising:
determining that the at least one of the plurality of TCP generic options is not supported between the UE and the first base station when the one or more header parameters do not correspond to the at least one of the plurality of TCP generic options;
selecting the second header compression profile between the first header compression profile and the second header compression profile; and
providing the first uncompressed header for transmission based on the second header compression profile.

12. The method of claim 1, further comprising:
establishing a transmission control protocol (TCP) connection between the UE and the first base station; and
communicating, with the first base station, a TCP data transmission over the TCP connection, wherein the TCP data transmission comprises the first packet with one of the first compressed header or the first uncompressed header.

13. The method of claim 1, further comprising:
determining an occurrence of a radio link failure (RLF) event in a connection between the UE and the first base station;
communicating, with the first base station, an indication of the RLF event; and
receiving, from the first base station, a radio resource control (RRC) reconfiguration message based on the indication of the RLF event, the RRC reconfiguration message comprising a packet data convergence protocol (PDCP) configuration information element that indicates the first listing of header generic options.

33

14. The method of claim 1, further comprising:
determining an occurrence of a radio link failure (RLF) event in a connection between the UE and the first base station;
communicating, with the first base station, an indication of the RLF event;
receiving, from the first base station, a radio resource control (RRC) reconfiguration message based on the indication of the RLF event, wherein the RRC reconfiguration message comprises an indication to the UE to initiate a handover from the first base station to a second base station;
initiating the handover from the first base station to the second base station; and
receiving, from the second base station, a radio resource control (RRC) reconfiguration message, the RRC reconfiguration message comprising a packet data convergence protocol (PDCP) configuration information element that indicates a second listing of header generic options that are supported between the UE and the second base station.

15. The method of claim 14, further comprising:
obtaining a second packet comprising a second uncompressed header that indicates one or more header parameters;
determining whether the one or more header parameters in the second uncompressed header corresponds to at least one header generic option in the second listing of header generic options;
communicating, with the second base station, the second packet having a second compressed header based on the first header compression profile when the one or more header parameters in the second uncompressed header corresponds to the at least one header generic option in the second listing of header generic options; and
communicating, with the second base station, the second packet having the second uncompressed header based on the second header compression profile when the one or more header parameters in the second uncompressed header does not correspond to the at least one header generic option in the second listing of header generic options.

16. An apparatus for wireless communication at a user equipment (UE), comprising:
at least one processor; and
a memory coupled to the at least one processor and storing computer-executable code, which when executed by the at least one processor, causes the apparatus to:
receive, from a first base station, a configuration indicating a first listing of header generic options that are supported between the UE and the first base station;
obtain a first packet comprising a first uncompressed header that indicates one or more header parameters;
determine whether the one or more header parameters in the first uncompressed header corresponds to at least one header generic option in the first listing of header generic options;
communicate, with the first base station, the first packet having a first compressed header based on a first header compression profile when the one or more header parameters in the first uncompressed header corresponds to the at least one header generic option in the first listing of header generic options; and
communicate, with the first base station, the first packet having the first uncompressed header based on a second header compression profile different than the

34 first header compression profile when the one or more header parameters in the first uncompressed header does not correspond to the at least one header generic option in the first listing of header generic options.

17. The apparatus of claim 16, wherein:
the first listing of header generic options comprises a plurality of header generic options,
each of the plurality of header generic options corresponds to a different one of a plurality of transmission control protocol (TCP) generic options, and
the code, which when executed by the at least one processor, further causes the apparatus to:
determine whether the one or more header parameters corresponds to at least one of the plurality of TCP generic options; and
determine whether the at least one of the plurality of TCP generic options is supported between the UE and the first base station based on a first Boolean value or a second Boolean value different than the first Boolean value, when the one or more header parameters corresponds to the at least one of the plurality of TCP generic options.

18. The apparatus of claim 17, wherein the code, which when executed by the at least one processor, further causes the apparatus to:
determine that the at least one of the plurality of TCP generic options is supported between the UE and the first base station based on the first Boolean value;
select the first header compression profile between the first header compression profile and the second header compression profile; and
compress the first uncompressed header into the first compressed header based on the first header compression profile.

19. The apparatus of claim 17, wherein the code, which when executed by the at least one processor, further causes the apparatus to:
determine that the at least one of the plurality of TCP generic options is not supported between the UE and the first base station based on the second Boolean value, when the one or more header parameters corresponds to the at least one of the plurality of TCP generic options;
select the second header compression profile between the first header compression profile and the second header compression profile; and
provide the first uncompressed header for transmission based on the second header compression profile.

20. The apparatus of claim 17, wherein the code, which when executed by the at least one processor, further causes the apparatus to:
determine that the at least one of the plurality of TCP generic options is not supported between the UE and the first base station when the one or more header parameters do not correspond to the at least one of the plurality of TCP generic options;
select the second header compression profile between the first header compression profile and the second header compression profile; and
provide the first uncompressed header for transmission based on the second header compression profile.

21. A method of wireless communication at a base station, the method comprising:
communicating, with a user equipment (UE), a configuration indicating a listing of header generic options that are supported between the UE and the base station;

receiving, from the UE, a first packet comprising a compressed header encoded with a first header compression profile; and decoding the compressed header into an uncompressed header based on the first header compression profile, the uncompressed header having one or more first header parameters that correspond to at least one header generic option in the listing of header generic options.

22. The method of claim 21, further comprising:

receiving, from the UE, a second packet comprising an uncompressed header based on a second header compression profile, the uncompressed header having one or more second header parameters that do not correspond to the at least one header generic option in the listing of header generic options.

23. The method of claim 22, wherein the communicating the configuration comprises:

transmitting, to the UE over a downlink channel, a radio resource control (RRC) reconfiguration message that includes a packet data convergence protocol (PDCP) configuration information element that indicates the listing of header generic options.

24. The method of claim 23, wherein the PDCP configuration information element further indicates the first header compression profile and the second header compression profile.

25. The method of claim 23, wherein the first header compression profile corresponds to a transmission control protocol (TCP) profile and the second header compression profile corresponds to an uncompressed profile.

26. The method of claim 25, wherein the TCP profile and the uncompressed profile are associated with a robust header compression (ROHC) protocol.

27. The method of claim 22, further comprising:

establishing a transmission control protocol (TCP) connection between the UE and the base station; and communicating, with the UE, a TCP data transmission over the TCP connection, wherein the TCP data transmission comprises one or more of the first packet having the compressed header or the second packet having the uncompressed header.

28. The method of claim 21, wherein:

the listing of header generic options comprises a plurality of header generic options, and each of the plurality of header generic options corresponds to a different one of a plurality of transmission control protocol (TCP) generic options.

29. An apparatus for wireless communication at a base station (BS), comprising:

at least one processor; and a memory coupled to the at least one processor and storing computer-executable code, which when executed by the at least one processor, causes the apparatus to:

communicate, with a user equipment (UE), a configuration indicating a listing of header generic options that are supported between the UE and the base station;

receive, from the UE, a first packet comprising a compressed header encoded with a first header compression profile; and decode the compressed header into an uncompressed header based on the first header compression profile, the uncompressed header having one or more first header parameters that correspond to at least one header generic option in the listing of header generic options.

30. The apparatus of claim 29, wherein the code, which when executed by the at least one processor, further causes the apparatus to:

receive, from the UE, a second packet comprising an uncompressed header based on a second header compression profile, the uncompressed header having one or more second header parameters that do not correspond to the at least one header generic option in the listing of header generic options.

* * * * *